US006447012B2

(12) United States Patent
Peter et al.

(10) Patent No.: US 6,447,012 B2
(45) Date of Patent: Sep. 10, 2002

(54) BELT RETRACTOR SYSTEM

(75) Inventors: Cornelius Peter, Bühl; Rolf Dürrstein, Bietigheim, both of (DE)

(73) Assignee: TRW Automotive Electronics & Components GmbH & Co. KG, Rodolfzell (DE)

( * ) Notice: Subject to any disclaimer, the term of this patent is extended or adjusted under 35 U.S.C. 154(b) by 0 days.

(21) Appl. No.: 09/726,666

(22) Filed: Nov. 29, 2000

(30) Foreign Application Priority Data

Dec. 1, 1999 (DE) ........................ 199 57 814.1

(51) Int. Cl.⁷ ................. B60R 22/195; B60R 22/46; B60R 22/48
(52) U.S. Cl. ................. 280/806; 280/807; 180/268; 242/390.8; 242/390.9
(58) Field of Search ................. 280/806, 807; 180/268; 242/390.8, 390.9; 310/67 R

(56) References Cited

U.S. PATENT DOCUMENTS

| 4,478,433 A | * 10/1984 | Taguchi et al. | 180/268 |
| 4,534,441 A | * 8/1985 | Kamijo et al. | 180/268 |
| 4,575,652 A | * 3/1986 | Gogue | 310/156.12 |
| 4,637,630 A | * 1/1987 | Nishimura et al. | 242/371 |
| 4,787,569 A | * 11/1988 | Kanada et al. | 242/371 |
| 5,201,385 A | * 4/1993 | Browne et al. | 180/268 |
| 5,218,253 A | * 6/1993 | Morehouse et al. | 310/156.26 |
| 5,532,531 A | * 7/1996 | Sakamoto | 310/49 R |
| 5,788,281 A | * 8/1998 | Yanagi et al. | 180/282 |
| 6,213,512 B1 | * 4/2001 | Swann et al. | 180/271 |

FOREIGN PATENT DOCUMENTS

| DE | 27 42 676 A1 | * 4/1979 |
| DE | 3502779 A1 | 9/1985 |
| DE | 4112579 U1 | 10/1991 |
| DE | 4018214 A1 | 12/1991 |
| DE | 69013352 T2 | 5/1995 |
| DE | 19636448 A1 | 4/1997 |
| DE | 19625004 A1 | 1/1998 |
| DE | 29717477 U1 | 1/1998 |
| DE | 19731689 C2 | 7/1999 |
| DE | 29908716 U1 | 10/1999 |
| GB | 2 335 890 A | * 10/1999 |

* cited by examiner

*Primary Examiner*—Paul N. Dickson
*Assistant Examiner*—Ruth Ilan
(74) *Attorney, Agent, or Firm*—Tarolli, Sundheim, Covell, Tummino & Szabo L.L.P.

(57) ABSTRACT

A belt retractor for an occupant restraint system comprises a frame, a belt reel rotatably mounted in the frame, an electric motor drive coupled to the belt reel, a locking mechanism for selectively blocking the belt reel, and a vehicle-sensitive sensor. The locking mechanism is actuated by an actuator. An electronic control unit is provided with an input interface and an output interface. The vehicle-sensitive sensor is connected to the input interface, and the actuator and the electric motor drive are connected to the output interface.

8 Claims, 4 Drawing Sheets

BELT RETRACTOR SYSTEM

FIELD OF INVENTION

The invention relates to a belt retractor for an occupant restraint system.

BACKGROUND OF THE INVENTION

In addition to the usual belt webbing and/or vehicle-sensitive locking functions modern belt retractors are equipped with additional functions where necessary. One of these additional functions is safeguarding loads or child seats by a state of blockage which is activated by complete unwinding and subsequent retraction of the belt webbing. Switching back into the locking condition in case of an emergency is achieved by complete retraction of the belt webbing. Another additional function is a belt fastening detection for which the withdrawn belt webbing length is determined.

Such additional functions of a belt retractor necessitate a high complexity of mechanical components. Particularly complex is to provide different types of belt retractors for the respective additional functions requested.

BRIEF SUMMARY OF THE INVENTION

This is achieved in a belt retractor for an occupant restraint system comprising a frame, a belt reel rotatably mounted in the frame, an electric motor drive coupled to the belt reel, a locking mechanism for selectively blocking the belt reel, and a vehicle-sensitive sensor. The locking mechanism is actuated by an actuator. An electronic control unit is provided with an input interface and an output interface. The vehicle-sensitive sensor is connected to the input interface, and the actuator and the electric motor drive are connected to the output interface.

The invention provides a novel belt retractor having a uniform mechanical basic design enabling a series of additional functions to be achieved when requested.

Instead of the conventional retraction spring the belt retractor according to the invention provides an electric motor instead of the conventional retraction spring which loads the belt reel with the retraction torque required in each case. The functions of the belt retractor are controlled by an electronic control unit including an input interface and an output interface. The vehicle-sensitive sensor is connected to the input interface and the actuator is connected to the output interface, as is the electric motor. This basic concept facilitates the adaption of the locking and retraction functions of the belt retractor to the respective requirements, since merely program data need to be adapted, according to which the electronic control unit works. Furthermore, various sensors can be connected to the input interface of the electronic control unit, the output signals of which are taken into account in driving the locking mechanism. Likewise further actuators or positioners and the like may be connected to the output interface of the electronic control unit, the functions of which are controlled in dependence of the sensor signals as polled via the input interface of the electronic control unit. The control unit signals the electric motor to provide a belt tensioning when the signal constellation of a plurality of sensors, connected to the input interface indicates an imminent vehicle collision. The control unit takes into account at least one of the following sensor signals: ABS signal, braking pressure signal, acceleration signal, vehicle speed signal, engine speed signal, belt force signal and absolute belt reel angle of rotation.

In the preferred embodiment the belt retractor includes an electric motor, more particularly a servo motor, which not only carries out the task of the retraction spring in a conventional mechanical belt retractor but also can ensure a pretension of the belt webbing in an imminent vehicle crash.

One of the sensors connected to the input interface yields in the preferred embodiment an incremental signal representing the rotation of the belt reel, preferably in conjunction with a further signal indicating the sense of rotation. These signals are analyzed by the electronic control unit by up/down counting to determine the absolute angle of rotation of the belt reel and thus the length of the belt webbing withdrawn.

In this preferred embodiment of the belt retractor has the following functions, some of which may also be achieved only when required:

child seat/load safeguarding belt fastening detection vehicle-sensitive blocking: where the belt reel of the belt retractor is blocked when a vehicle-sensitive sensor signals a severe vehicle impact;

retraction spring;

comfort gearing: smooth gear transmission between the motor shaft and the belt reel;

blocking on non-locked seatback: where the belt reel is blocked when the backrest of a vehicle seat is not a locked position (to indicate that the backrest should be locked before the seat belt is fastened);

belt webbing-sensitive blocking: where the belt reel is blocked when the belt webbing is abruptly pulled;

belt webbing pretensioning.

On the basis of a uniform electromechanical basic concept, numerous embodiments, differing in terms of functionality, can be provided with the belt retractor system according to the invention. The functionality is essentially determined by the sensors connected to the input interface of the electronic control unit and by the unerasably stored program according to which the control unit operates.

The preferred embodiment provides additional functions which can not be realized in conventional belt retractors. One of these additional functions is the precautionary tensioning of the belt webbing in a critical situation, e.g. a full braking. By making use of a high-performance electric motor drive a tensioning force of 250 N or more is possible. A tensioning travel of 120 mm or more for a tensioning time of only about 120 ms is realistic. Such pretensioning enables the belt slack to be eliminated already prior to an accident to minimize the risk of injury of the vehicle occupants and to optimize the effectiveness of the conventional belt tensioner, in particular the pyrotechnic-type belt tensioner.

Belt webbing pretensioning may also be used to correct the sitting posture of a vehicle occupant to minimize the risk of injury by inflatable restraint means (air bag).

When, following a belt webbing pretensioning, normal driving conditions reoccur, belt tensioning can be reversed.

On the other hand, after pretensioning of the belt webbing and subsequent release have occurred, a renewed pretensioning of the belt webbing is possible.

In the preferred embodiment the electric motor is coupled by a toothed belt to a gearwheel side-mounted to the belt reel, the gearwheel having a diameter larger than that of the drive pinion of the electric motor. The toothed belt is set under tension by a belt tightener as a function of the load. In normal operation the belt tension is small, so that the drive works extremely silent and with low wear. On tensioning of the belt webbing, the belt tension is increased in order to assure a transmission of force without skipping of teeth. At the same time, there is achieved an optimum balance in terms of tooth clearance and tolerances.

The electric motor employed is preferably a low-wear, brushless four-phase motor, its bifilar stator winding achieving low commutating losses. Using a motor with an outside rotor a compact design is achieved. The outside rotor carries preferably a 14-pole neodymium magnetic ring to enable a high drive moment in line with a compact design, particularly in a short-time overload operation. Two Hall sensors yield the rotor position, the sense of rotation and, from this, the length of belt webbing withdrawn.

The locking mechanism of the belt retractor consists of an apertured disk on the flange of the belt reel and a latching pin mounted axially shiftable and spring-loaded at the frame of the retractor, that pin being selectively latched in the holes of the apertured disk of the belt reel. This engagement of the latching pin in the holes of the apertured disk is facilitated by lead-in ramps adjacent to the holes. The latching pin is maintained in the non-activated resting position by an electromagnet. In the non-energized condition the latching pin is moved into the locked position by the spring loading.

The electronic control unit of the belt retractor meets more particularly the following requirements:
- motor commutation;
- torque control;
- overload protection;
- drive of the belt reel release;
- control of all comfort and safety functions;
- continual computation of the actual belt withdrawal length via the absolute angle of rotation of the belt reel;
- input signals of the various connected sensors, discretely and via a connected bus system (CAN):
- fast 8-bit control unit with idle mode and integrated EEPROM;
- stator integrated on printed circuit board.

In the preferred embodiment of a vehicle occupant restraint system all belt retractors have the same electromechanical basic design and differ only in their functionality determined substantially by the program data stored in the electronic control unit. Thus, for example, the functionality of the front belt retractors differ from those of the rear belt retractors. The electronic control units of all belt retractors may be linked to a common central sensor.

BRIEF DESCRIPTION OF THE DRAWINGS

Further features and advantages of the invention will become apparent from the following description of a preferred embodiment and from the accompanying drawings to which reference is made and in which.

DETAILED DESCRIPTION OF THE INVENTION

Figure 1:
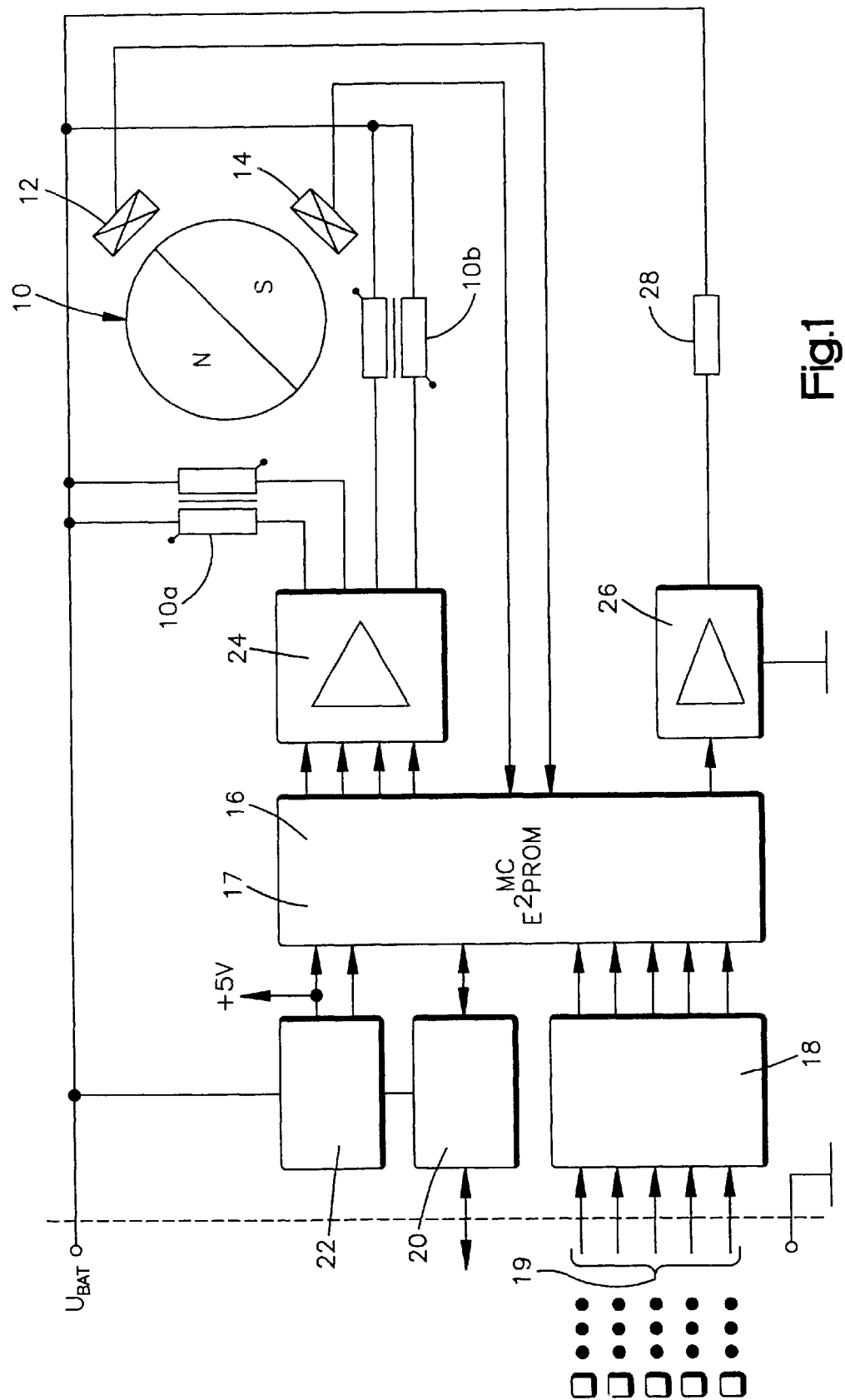
FIG. 1 is a block diagram of the electronic control unit of the belt retractor.
Figure 2:
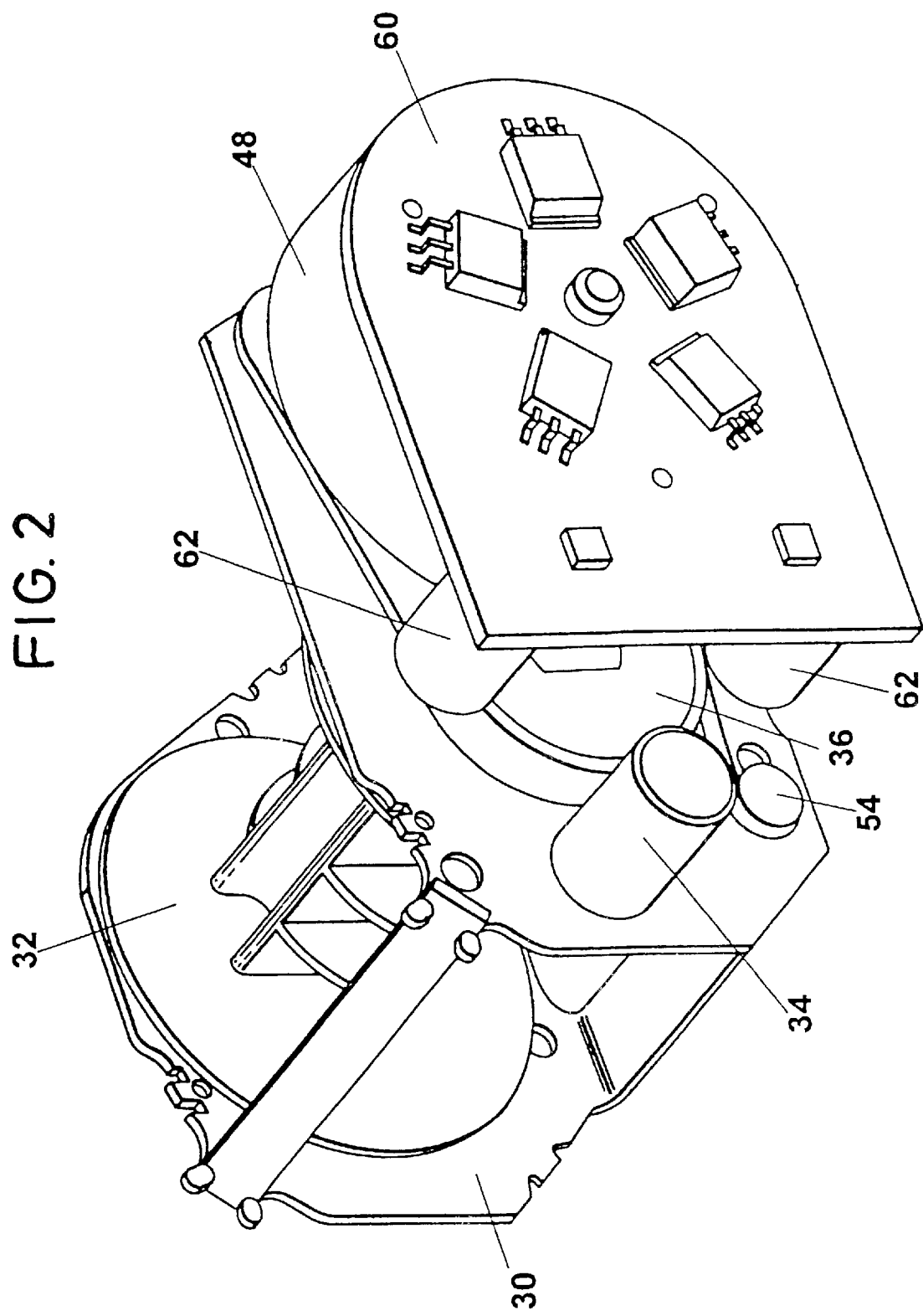
FIG. 2 is a perspective overall view of the belt retractor including an electric motor drive.
Figure 3:
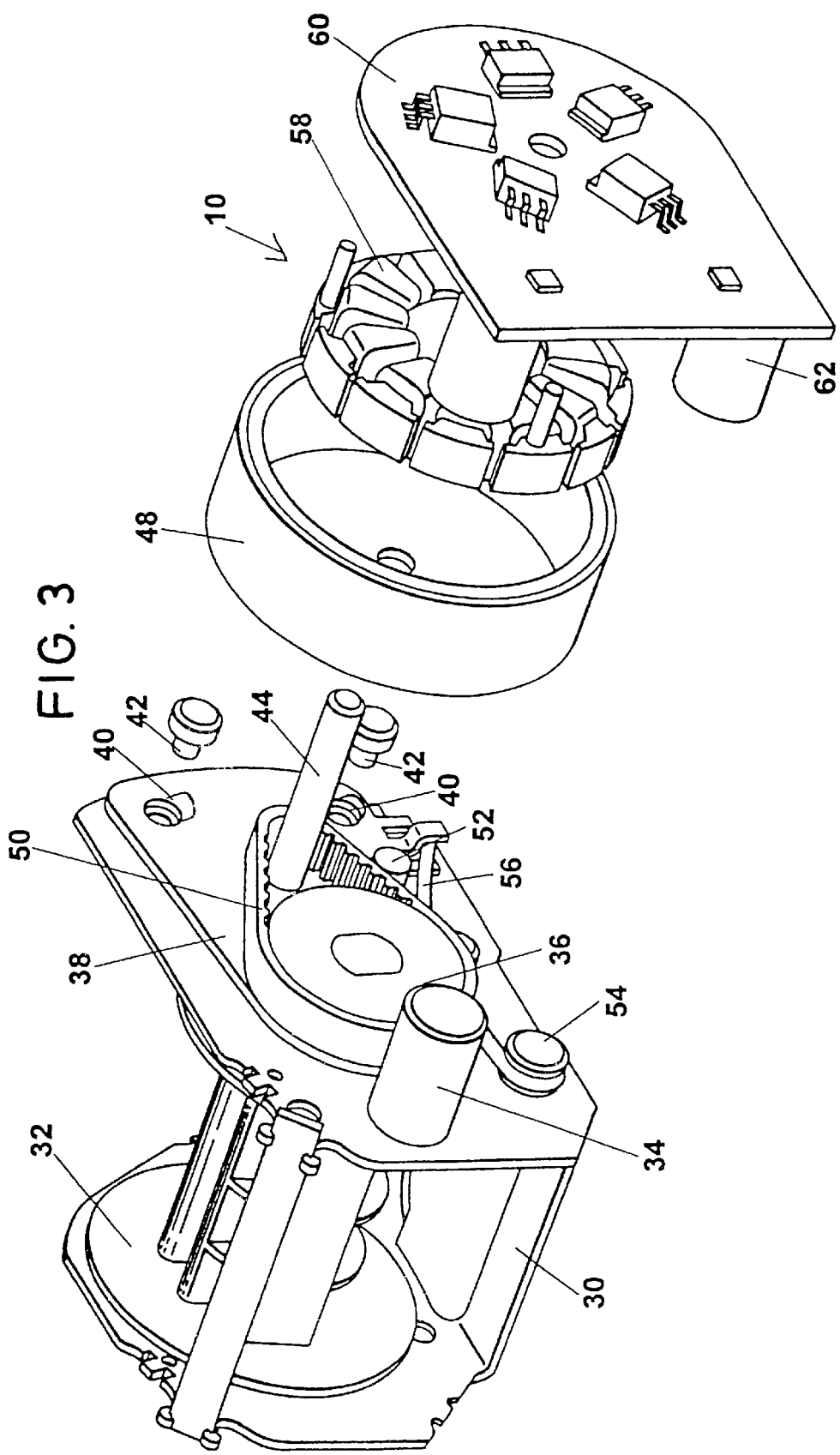
FIG. 3 is an exploded view of the belt retractor of FIG. 2.
Figure 5:
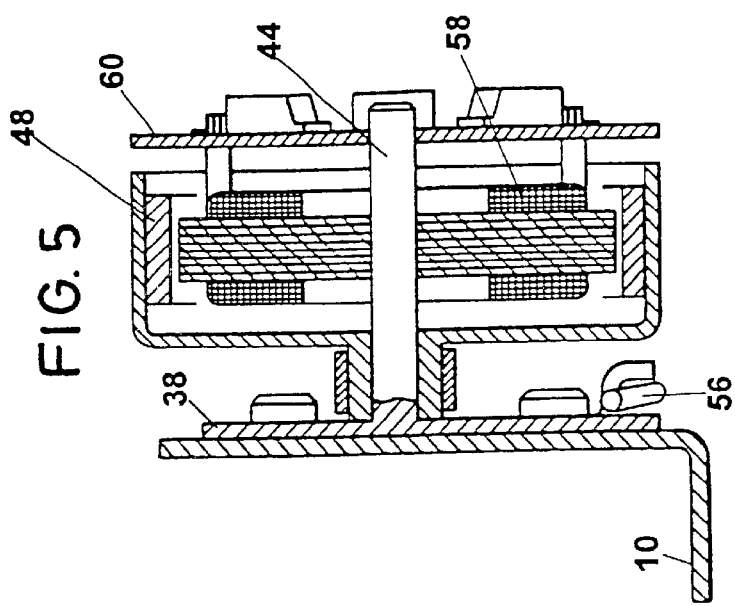
FIG. 5 is a schematic axial section of electric motor with drive pinion.

The block diagram of FIG. 1 shows an electric motor 10 which is an outside rotor having a neodymium magnetic ring. The outer rotor is designed preferably so as to be 14-pole. Further, the electric motor 10 is a brushless four-phase DC motor, the stator winding of which is designed bifilar. Adjacent the outside rotor are arranged two Hall sensors 12, 14. With these Hall sensors 12, 14, the rotation of the outside rotor is detected incrementally, the sense of rotation being also detected, so that an absolute angle of rotation can be determined. A microcomputer 16 receives amongst the signals from the Hall sensors 12, 14 a plurality of switching signals 19 via an interface 18 and is furthermore coupled bidirectionally via a transceiver 20 with a CAN bus. The current supply is delivered to the microcomputer 16 via a voltage regulator 22 from the onboard voltage $U_{Bat}$. The microcomputer 16 signals the stator windings 10a and 10b of the electric motor 10 via a driver circuit 24. The driver circuit 24 comprises a high-performance semiconductor power switches of the type FET, which have an extremely low volume resistance and can therefore be directly mounted onto a printed circuit board. Via a further driver circuit 26, the output interface 17 of the microcomputer 16 signals the magnetic coil 28 of an electromagnet, which actuates a latching mechanism of the belt retractor described below.

The belt retractor has a substantially U-shaped frame 30 with parallel legs between which a belt reel 32 is rotatably mounted. Rotation of the belt reel 32 in the frame 30 can be blocked in a load-bearing manner by a locking pawl, a locking pin or some of these elements. The locking pawl or the locking pin is actuated by an electromagnet 34. This electromagnet 34 has the magnetic coil 28 shown in FIG. 1.

Figure 4:
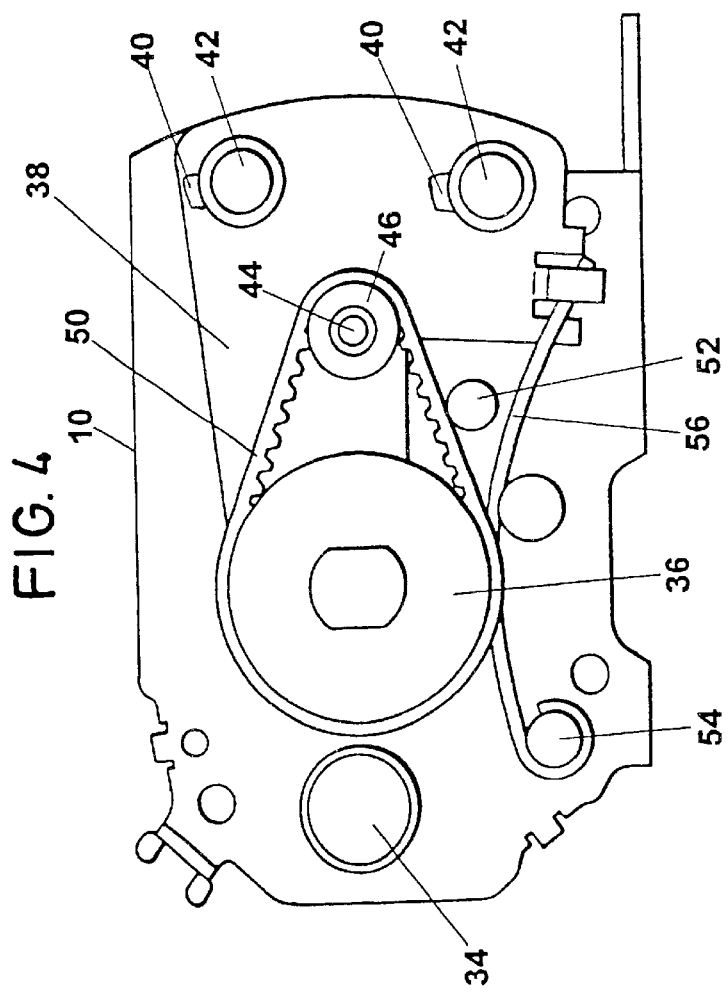
FIG. 4 is a side view of the belt retractor with the electric motor drive removed.

A toothed belt disc 36 is non-rotatably coupled with the belt reel 32. At the outer side of a leg of the frame 30, a support plate 38 is mounted for limited rotation about the axle of the belt reel 32. For limiting the pivoting movement of the support plate 38, the latter is provided with two oblong holes 40 which are engaged by two pins 42 anchored to the frame 30. The support plate 38 mounts a bearing pin 44 on which the outside rotor 48 of the electric motor 10 is mounted, the rotor comprising a drive pinion 46. A toothed belt 50 has been fitted to the toothed belt disc 36 and the drive pinion 46. On the external circumference of the toothed belt 50 and between toothed belt disc 36 and drive pinion 46 there is a tensioning pulley 52 which is rotatably mounted on the side leg of the frame 30. A spring wire 56 fixedly provided on a pin on the side leg of the frame presses against the support plate 38 and acts upon the latter with an anti-clockwise torque in FIG. 4, whereby the support plate 38 is brought into the pivoted position shown in FIG. 4, in which the tensioning pulley 52 is out of engagement with the toothed belt 50. The support plate takes up this pivoted position if the load transmitted by the toothed belt 50 is low. Upon an increased load, there acts onto the support plate 38 a torque opposite to the spring wire 56 and which is caused by the tensile stress in the toothed belt 50. This tensile stress has a component in tangential direction with respect to the pivotal axis of the support plate 38. The higher the tensile load, the larger this component. On pivoting of the support plate 38 in opposition to the action of the spring wire 56, the toothed belt 50 comes into engagement with the periphery of the tensioning pulley 52, so that the toothed belt 50 is tensioned according to the increase of the transmitted load.

The stator 58 of the electric motor 10, together with the complete signaling electronic means, is mounted on a printed circuit board 60. The printed circuit board 60 also has the Hall sensors 12, 14 shown in FIG. 1. Further, it has at least one condenser 62 which has a high capacity and serves as an energy reserve. The printed circuit board 60 is attached to a side leg of the frame 30 by stud bolts, for example.

The functionality of the belt retractor described is determined by the input signals processed in the microcomputer 16 and by the program routines kept available in its program memory. Thus, with an identical electromechanical basic design there can be realized belt retractors having an extremely variable functionality.

What is claimed is:

1. A belt retractor for an occupant restraint system, comprising:

a frame, a belt reel rotatably mounted in said frame, a locking mechanism for selectively blocking said belt reel, a vehicle-sensitive sensor, an actuator for actuating said locking mechanism, an electric motor by which said belt reel is drivable, an electronic control unit including an input interface and an output interface, said vehicle-sensitive sensor being connected to said input interface, and said actuator and said electric motor being connected to said output interface.

said control unit signaling said electric motor to provide a belt tensioning when the signal constellation of a plurality of sensors connected to said input interface indicates an imminent vehicle collision, said electric motor comprising a 14-pole outside rotor, said electric motor being coupled by a toothed belt to said belt reel, said toother belt coupling a drive pinion of said electric motor to a gearwheel side-mounted on said belt reel, said gearwheel having a diameter larger than that of said drive pinion, said electric motor being supported on a support plate side-mounted to a leg of said frame so as to be capable of pivoting to a limited extent and, by pivoting of said support plate, said toothed belt being pressed in a section between said gearwheel and said drive pinion against a tensioning pulley mounted on said leg of said frame.

2. The belt retractor as set forth in claim 1, wherein said support plate is biased by a spring into a pivoted position in which said tensioning pulley is spaced away from said toothed belt and, with the tensile stress occurring in said toothed belt when loaded, said support plate is moved automatically and to an extent which depends on the load into an opposed pivoted position in which said tensioning pulley presses against said toothed belt.

3. Th ebelt reatractor as set forth in claim 1, wherein said electric motor is grouped together with a printed circuit board into an assembly unit, said printed circuit board being mounted on an electronic signaling circuit and comprising power semiconductor components.

4. The belt retractor as set forth in claim 3, comprising sensors assigned to said electric motor, said sensors providing signals from which an absolute angle of rotation of said belt reel corresponding to the withdrawn belt webbing length can be determined by said control unit.

5. The belt retractor as set forth in claim 4, wherein said control unit for signaling said electric motor takes into account at least one of the following sensor signals; ABS signal, braking pressure signal, acceleration signal, vehicle speed signal, engine speed signal, belt force signal, absolute belt reel angle of rotation.

6. The belt retractor as set forth in 4, wherein said control unit loads aid belt reel via said electric motor with a permanent retraction moment, the value of which can be varied across said absolute angle of which can be reel.

7. The belt retractor as set forth in claim 6, wherein said control unit loads said belt reel via siad electric motor with a permanent retraction moment, the value of which can be varied across said absolute angle of rotation of said belt reel.

8. An occupant restraint system for vehicles comprising a plurality of belt retractors, each belt retractors of said plurality of belt retractors comprising:

a frame, a belt reel rotatably mounted in said frame, a locking mechanism for selectively blocking said belt reel, a vehicle-sensitive sensor, an actuator for actuating said locking mechanism, an electric motor by which said belt reel is drivable, an electronic control unit including an input interface and an output interface, said vehicle-sensitive sensor being connected to said input interface, and said actuator and said electric motor being connected to said output interface, said control unit signaling said electric motor to provide a belt tensioning when the signal constellation of a plurality of sensors connected to said input interface indicates an imminent vehicle collision, said electric motor comprising a 14-pole outside rotor, said electric motor being coupled by a toothed belt to said belt reel, said toothed belt coupling a drive pinion of said electric motor to a gearwheel side-mounted on said belt reel, said gearwheel having a diameter larger than that of said drive pinion, said electric motor being supported on a support plate side-mounted to a leg of said frame so as to be capable of pivoting to a limited extent and, by pivoting of said support plate, said toothed being pressed in a section between said gearwheel and said drive pinion against a tensioning pulley mounted on said leg of said frame.

* * * * *

UNITED STATES PATENT AND TRADEMARK OFFICE
CERTIFICATE OF CORRECTION

PATENT NO. : 6,447,012 B2
DATED : September 10, 2002
INVENTOR(S) : Cornelius Peter et al.

It is certified that error appears in the above-identified patent and that said Letters Patent is hereby corrected as shown below:

Column 5,
Line 31, delete "toother" and insert -- toothed --.
Line 52, delete "Th ebelt reatractor" and insert -- the belt retractor --.

Column 6,
Line 15, delete "which can be" and insert -- rotation of said belt --.
Line 16, delete "6" and insert -- 5 --.
Line 51, after "toothed" insert -- belt --.

Signed and Sealed this

Twenty-ninth Day of June, 2004

JON W. DUDAS
*Acting Director of the United States Patent and Trademark Office*